United States Patent
Lai et al.

(10) Patent No.: US 10,054,161 B1
(45) Date of Patent: Aug. 21, 2018

(54) MEMBRANE RESTRICTOR AND HYDROSTATIC BEARING MODULE

(71) Applicant: National Tsing Hua University, Hsinchu (TW)

(72) Inventors: Ta-Hua Lai, Taipei (TW); Shih-Chieh Lin, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 15/682,563

(22) Filed: Aug. 22, 2017

(30) Foreign Application Priority Data

Jun. 9, 2017 (TW) .............................. 106119197 A

(51) Int. Cl.
*F16C 32/06* (2006.01)
*F16C 29/02* (2006.01)
(Continued)

(52) U.S. Cl.
CPC ........ *F16C 32/0644* (2013.01); *F16C 29/025* (2013.01); *F16C 33/748* (2013.01); *F16C 35/02* (2013.01)

(58) Field of Classification Search
CPC ..................... F16C 32/0644; F16C 29/025
See application file for complete search history.

(56) References Cited

U.S. PATENT DOCUMENTS 3,758,175 A * 9/1973 Van Roojen ........ F16C 32/0644
137/503
4,351,574 A * 9/1982 Furukawa .............. B23Q 1/385
384/100
(Continued)

FOREIGN PATENT DOCUMENTS

CN 201293044 8/2009
CN 101403415 6/2010
(Continued)

OTHER PUBLICATIONS

Ta-Hua Lai et al., "Parameters design of a membrane-type restrictor with single-pad hydrostatic bearing to achieve high static stiffness," Tribology International, vol. 107, 2017, pp. 206-212.
(Continued)

*Primary Examiner* — Thomas R Hannon
(74) *Attorney, Agent, or Firm* — JCIPRNET

(57) ABSTRACT

A membrane restrictor adapted to be connected to a pump and a bearing is provided. The pump is adapted to supply fluid to a location between the bearing and the rail through the membrane. The bearing is adapted to be disposed on a rail. The membrane restrictor includes a casing and a membrane. The casing has a chamber, an inlet and an outlet communicating with each other through the chamber, and a restricting plane. The pump is adapted to be connected to the inlet; the bearing is adapted to be connected to the outlet. The membrane is disposed in the chamber. The restricting plane is an inner surface of the casing adjacent to the outlet and towards the membrane. Dimensionless stiffness of the membrane is Kr*, and $1.33 \leq K_r^* \leq 2$. $K_r^* = K_r L_0/(p_s A_r)$. Here, $K_r$ is stiffness of the membrane, $L_0$ is a distance from the membrane to the restricting plane when no fluid is supplied by the pump (i.e., assembling clearance of the membrane), $p_s$ is pressure supplied by the pump, and $A_r$ is an effective area of the restricting plane. A hydrostatic bearing module having the membrane restrictor is further provided.

10 Claims, 7 Drawing Sheets

(51) Int. Cl.
  *F16C 33/74* (2006.01)
  *F16C 35/02* (2006.01)

(56) References Cited

U.S. PATENT DOCUMENTS 5,484,208 A     1/1996  Kane et al.
8,597,573 B2*  12/2013  Gilligan ............... B01L 3/0289
                                                     422/50

FOREIGN PATENT DOCUMENTS

| CN | 202391967 | 8/2012 |
| CN | 102691723 | 6/2014 |
| CN | 103909469 | 3/2016 |
| TW | 201014675 | 4/2010 |
| TW | 201026974 | 7/2010 |
| TW | 201040406 | 11/2010 |
| TW | 201043800 | 12/2010 |
| TW | 201137554 | 11/2011 |
| TW | 201250139 | 12/2012 |
| TW | I458586   | 11/2014 |

OTHER PUBLICATIONS

"Office Action of Taiwan Counterpart Application", dated Apr. 2, 2018, p. 1-p. 4.

* cited by examiner

MEMBRANE RESTRICTOR AND HYDROSTATIC BEARING MODULE

CROSS-REFERENCE TO RELATED APPLICATION

This application claims the priority benefit of Taiwan application serial no. 106119197, filed on Jun. 9, 2017. The entirety of the above-mentioned patent application is hereby incorporated by reference herein and made a part of this specification.

BACKGROUND OF THE INVENTION

Field of the Invention

The invention relates to a restrictor and a bearing module and particularly relates to a membrane restrictor and a hydrostatic bearing module.

Description of Related Art

Generally, a complete hydrostatic guide rail system includes three parts: an external oil-supplying system (pump), a hydrostatic bearing, and a restrictor. The external oil-supplying system supplies lubrication oil with certain pressure to an oil chamber of the hydrostatic bearing adjacent to a surface of a rail through the restrictor, thus forming an oil film between the bearing and the rail. The bearing and the rail are thus separated, and an effect of hydrostatic lubrication is achieved.

Differences in the structures and sizes of restrictors change the restricting properties of the restrictors and further affect the performance of adjusting the pressure of the oil chamber as well as the performance of the hydrostatic bearing. The hydrostatic bearing loses its stiffness and bearing ability without the restrictor. As long as the restrictor is well selected, the bearing can have the greatest stiffness. The existing restrictors come in a variety of types, yet the membrane restrictors have the best performance among all. Hence, people in the pertinent art are eager to discuss how to ensure the performance of the membrane restrictors.

SUMMARY OF THE INVENTION

The invention provides a membrane restrictor capable of maintaining an oil film between a bearing and a rail to be of a certain thickness and providing the greatest bearing stiffness.

The invention provides a hydrostatic bearing module that has the aforementioned membrane restrictor and is integrated onto the bearing.

A membrane restrictor of the invention is adapted to be connected to a pump and a bearing. The bearing is adapted to be disposed on a rail. The pump is adapted to supply fluid to a location between the bearing and the rail through the membrane restrictor. The membrane restrictor includes a casing and a membrane. The casing includes a chamber, an inlet and an outlet communicating with the chamber, and a restricting plane. The pump is adapted to be connected to the inlet, and the bearing is adapted to be connected to the outlet. The membrane is located in the chamber. The restricting plane is an inner surface of the casing which is adjacent to the outlet and faces toward the membrane. Dimensionless stiffness of the membrane is $K_r^*$, and $1.33 \leq K_r^* \leq 2$. $K_r^* = K_r L_0/(p_s A_r)$, wherein $K_r$ is the stiffness of the membrane, $L_0$ is assembling clearance of the membrane (i.e., a distance from the membrane to the restricting plane when no fluid is supplied by the pump), $p_s$ is a hydraulic pressure supplied by the pump, and $A_r$ is an effective area of the restricting plane.

In an embodiment of the invention, the dimensionless stiffness $K_r^*$ of the membrane restrictor equals 1.33.

In an embodiment of the invention, a design restriction ratio of the membrane restrictor is $\lambda$, and $0.1 \leq \lambda \leq 0.5$, wherein $\lambda = R_{rl}/R_0$, $R_{rl}$ is a hydraulic resistance of the fluid flowing through the restricting plane when the distance from the membrane to the restricting plane is $L_0$, and $R_0$ is a predetermined hydraulic resistance of the fluid flowing through the bearing.

In an embodiment of the invention, a design restriction ratio $\lambda$ of the aforementioned membrane restrictor equals 0.25.

A hydrostatic bearing module of the invention is adapted to be movably disposed on a rail and connected to a pump. The hydrostatic bearing module includes a bearing and a membrane restrictor integrated on the bearing. The pump is adapted to supply fluid to a location between the bearing and the rail through the membrane restrictor. The membrane restrictor includes a casing and a membrane. The casing includes a chamber, an inlet and an outlet communicating with each other through the chamber, and a restricting plane. The pump is adapted to be connected to the inlet, and the bearing is adapted to be connected to the outlet. The membrane is located in the chamber. The restricting plane is an inner surface of the casing that is located adjacent to the outlet and faces toward the membrane. Dimensionless stiffness of the membrane restrictor is $Kr^*$, $K_r^* = K_r L_0/(p_s A_r)$, and $1.33 \leq K_r^* \leq 2$, wherein $K_r$ is a stiffness of the membrane, $L_0$ is assembling clearance of the membrane, $p_s$ is a hydraulic pressure supplied by the pump, and $A_r$ is an effective area of the restricting plane.

In an embodiment of the invention, the dimensionless stiffness $Kr^*$ of the membrane restrictor equals 1.33.

In an embodiment of the invention, a design restriction ratio of the aforementioned membrane restrictor is $\lambda$, $\lambda = R_{rl}/R_0$, and $0.1 \leq \lambda \leq 0.5$. Here, $R_{rl}$ is a hydraulic resistance of the fluid flowing through the membrane restrictor when the distance from the membrane to the restricting plane is $L_0$, and $R_0$ is a predetermined hydraulic resistance of the fluid flowing through the bearing.

In an embodiment of the invention, a design restriction ratio $\lambda$ of the aforementioned membrane restrictor equals 0.25.

In an embodiment of the invention, the aforementioned bearing includes a sliding block slidably fitting the rail. The membrane restrictor is detachably disposed on the sliding block.

In an embodiment of the invention, the casing of the membrane restrictor includes a plate detachably disposed on the sliding block and a cover detachably disposed on the plate. The plate includes a recess and a through hole communicating with the recess. The membrane is disposed in the recess. The fluid is adapted to flow to a location between the plate and the rail through the through hole.

Based on the above, the membrane restrictor of the hydrostatic bearing module of the invention is capable of maintaining the oil film located between the bearing and the rail to be of a certain thickness through limiting the dimensionless stiffness of the membrane to be within the range of $1.33 \leq K_r^* \leq 2$, so as to ensure the greatest bearing stiffness. Additionally, the membrane restrictor of the hydrostatic bearing module of the invention is integrated on the bearing;

hence, the membrane restrictor only occupies a small volume, and the membrane restrictor is still capable of achieving good effects.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
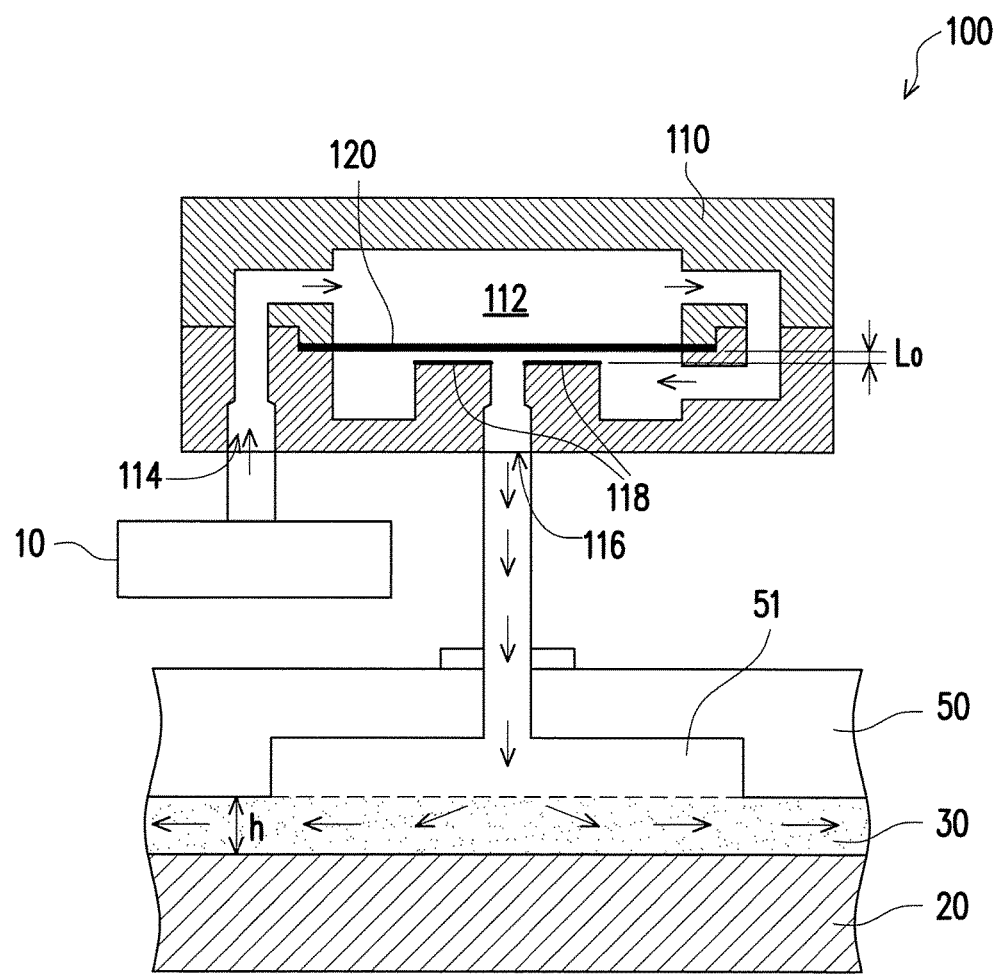
FIG. 1 is a schematic diagram illustrating a membrane restrictor in an embodiment of the invention.

FIG. 1 is a schematic diagram illustrating a membrane restrictor in an embodiment of the invention. Referring to FIG. 1, a membrane restrictor 100 of the embodiment is adapted to be connected to a pump 10 and a bearing 50. The bearing 50 is adapted to be disposed on a rail 20 and is able to move along the rail 20. FIG. 1 schematically depicts a portion of the bearing 50 and a portion of the rail 20, and the types and the shapes of the bearing 50 and the rail 20 are not limited thereto. Moreover, in other embodiments, the bearing 50 may also be a journal bearing (an axis of rotation is not depicted in FIG. 1) and move in a linear way or in a rotary way, which should not be construed as a limitation to the way in which the bearing 50 moves.

As shown in FIG. 1, in this embodiment, the membrane restrictor 100 includes a casing 110 and a membrane 120. The casing 110 includes a chamber 112, an inlet 114 and an outlet 116 communicating with the chamber 112, and a restricting plane 118. From FIG. 1, it can be learned that the pump 10 is connected to the inlet 114, and the bearing 50 is connected to the outlet 116. The membrane 120 is located in the chamber 112 and divides the chamber 112 into an upper half and a lower half, which can communicate with each other at right space within the chamber. The restricting plane 118 is an inner surface of the casing 110 that is adjacent to the outlet 116 and faces the membrane 120. As depicted in FIG. 1, the restricting plane 118 is the inner surface of a part of the casing 110 that surrounds the outlet 116 and faces the membrane 120. A distance from the membrane 120 to the restricting plane 118 is $L_0$. $L_0$ is the minimum distance from the membrane 120 to a part of the casing 110 that is adjacent to the outlet 116.

It should be explained that FIG. 1 schematically shows how fluid flows to a location between the bearing 50 and the rail 20 through the membrane restrictor 100, and the membrane restrictor 100 is illustrated as being located above the bearing 50. In reality, a relative location of the membrane restrictor 100 and the bearing 50 is not limited as long as a pipeline is provided for fluid to flow between the membrane 100 and the bearing 50.

In this embodiment, the pump 10 is adapted to supply fluid (such as lubrication oil) to a location between the bearing 50 and the rail 20 through the membrane restrictor 100, so as to form an oil film 30 between the bearing 50 and the rail 20 and effectively reduce friction generated when the bearing 50 slides relative to the rail 20. As a result, the bearing 50 is able to easily and smoothly slide relative to the rail 20. More specifically, an oil path of the fluid (hereinafter referred to as lubrication oil) supplied by the pump 10 is from the inlet 114 of the casing 110 to the membrane restrictor 100, and the lubrication oil flows from the upper half of the chamber 112 to the lower half of the chamber 112. The lubrication oil flows through a space between the membrane 120 and the restricting plane 118, leaves the membrane restrictor 100 from the outlet 116 and flows to the bearing 50, enters an oil chamber 51 of the bearing 50, and forms the oil film 30 between the bearing 50 and the rail 20.

In general, the oil film 30 located between the bearing 50 and the rail 20 needs to be maintained at a certain thickness. However, since the bearing 50 may hold other objects (not depicted), the thickness h of the oil film 30 located between the bearing 50 and the rail 20 may change when the bearing 50 is loaded with external forces. For example, the thickness h of the oil film 30 located between the bearing 50 and the rail 20 decreases when the bearing 50 bears a large load, such that a pressure of the oil chamber 51 of the bearing 50 and the outlet 116 as pressure in the center of the lower half of the chamber 112, increases. Since the membrane 120 is flexible, the membrane 120 protrudes upwards and a distance from the membrane 120 to the restricting plane 118 increases (i.e., greater than $L_0$) when the pressure in the outlet 116, as the pressure in the center of the lower half of the chamber 112 increases. Thereby, it is more easily for the lubrication oil to pass a space between the membrane 120 and the restriction plane 118, flow out of the membrane restrictor 100 and then flow toward the bearing 50, and the thickness h of the oil film 30 located between the bearing 50 and the rail 20 is increased accordingly.

Similarly, the thickness h of the oil film 30 located between the bearing 50 and the rail 20 increases when the bearing 50 bears a small load, such that the pressure of the oil chamber 51 of the bearing 50 and the lower half of the chamber 112 decreases. The membrane 120 correspondingly protrudes downwards, and the distance from the membrane 120 to the restriction plane 118 is reduced (i.e., smaller than $L_0$). As such, it is more difficult for the lubrication oil to pass through the space between the membrane 120 and the restriction plane 118, the amount of the lubrication oil flowing out of the membrane restrictor 100 is reduced, and the thickness h of the oil film 30 located between the bearing 50 and the rail 20 is decreased accordingly.

That is to say, the shape of the membrane 120 of the membrane restrictor 100 may be adaptively changed, such that the hydraulic resistance and the amount of the fluid in the membrane restrictor 100 are changed, and that a feedback effect may be further achieved. Undoubtedly, in addition to the membrane 120, other parameters of the membrane restrictor 100 are also considerably important. The parameters enable the bearing 50 to have good stiffness and allow an oil film 30 located between the bearing 50 and the rail 20 to have a certain thickness even when the bearing 50 bears object. The membrane restrictor 100 provided in this embodiment is able to effectively provide the bearing 50 with good stiffness due to certain designed parameters, such that the thickness h of the oil film 30 located between the bearing 50 and the rail 20 may be maintained at a certain thickness. That is to say, the required thickness h of the oil film 30 can be maintained even when the bearing 50 bears a great load.

It is worth mentioning that the load of the bearing 50 is presented below in a dimensionless manner to avoid a difference in numerical values due to different units. The dimensionless load of the bearing 50 is $W/A_e p_s$, wherein W is a load of the bearing 50 and is defined by $A_e p_s$, $A_e$ is an effective area of the bearing 50, p is a pressure of the fluid in the oil chamber 51 of the bearing 50, and $p_s$ is a hydraulic pressure supplied by the pump 10. Similarly, a ratio of an actual thickness h of the oil film to a predetermined thickness $h_0$ of the oil film is shown to avoid a difference in numerical values due to different units. It should be explained that ho is a predetermined value and is thus not marked in the drawings.

According to simulations and experiments, when the dimensionless stiffness $K_r^*$ and the design restriction ratio $\lambda$ of the membrane restrictor 100 are controlled to be in a certain range, the dimensionless load of the bearing 50 is $W/A_e p_s$, and a ratio of an actual thickness h of the oil film/a predetermined thickness $h_0$ of the oil film has good performance. The dimensionless stiffness $K_r^*$ may be defined by $Kr^* = K_r L_0/(p_s A_r)$.

Here, $K_r$ is the stiffness of the membrane 120, $L_0$ is a distance, also known as assembling clearance of the membrane 120 and shown in FIG. 1, from the membrane 120 to the restriction plane 118 when the pump 10 is not activated, $p_s$ is a hydraulic pressure, also known as a supply pressure, supplied by the pump 10, and $A_r$ is an effective area of the restricting plane 118. Moreover, the design restriction ratio $\lambda$ of the membrane restrictor 100 is defined by $\lambda = R_{ri}/R_0$. Here, $R_{ri}$ is a hydraulic resistance of the fluid flowing through the restricting plane 118 when the distance from the membrane 120 to the restricting plane 118 is $L_0$. That is to say, $R_{ri}$ is a hydraulic resistance of the fluid flowing through the restricting plane 118 when a pressure of the chamber 112 above the membrane 120 equals a pressure of the outlet 116 under the membrane 120. $R_{ri}$ may also be put as an equivalent hydraulic resistance of the restricting plane 118 while the assembling clearance is given. $R_{ri}$ may be considered as a hydraulic resistance of the membrane restrictor 100 because the hydraulic resistance of the restricting plane 118 is much greater than the hydraulic resistance of other pipelines inside the membrane restrictor 100. $R_0$ is a predetermined hydraulic resistance of the fluid flowing through the bearing 50 and is inversely proportional to a cubic of the thickness h of the oil film 30.

Figure 2:
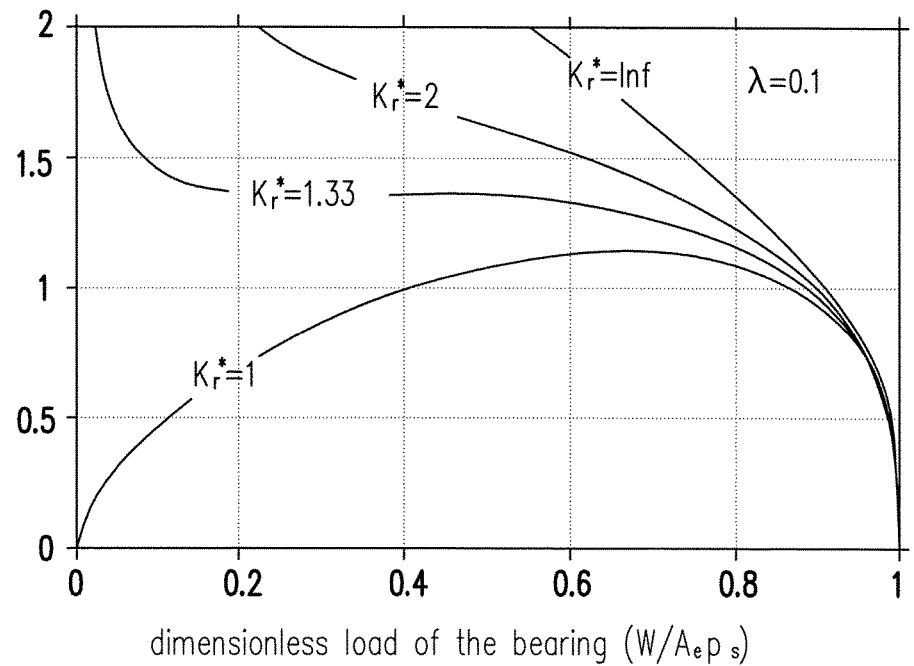
FIG. 2 to FIG. 4 respectively illustrate the relation of a dimensionless load of a bearing and an actual thickness/a predetermined thickness of an oil film when a design restriction ratio λ of the membrane restrictor as depicted in FIG. 1 is 0.1, 0.25, and 0.5.
Figure 3:
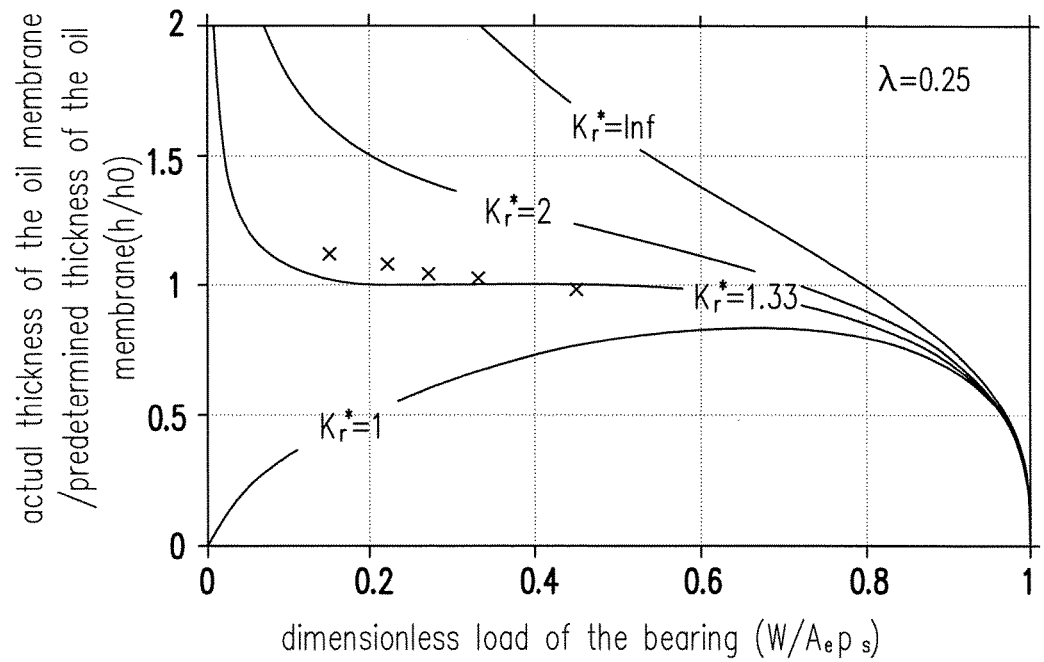
Figure 4:
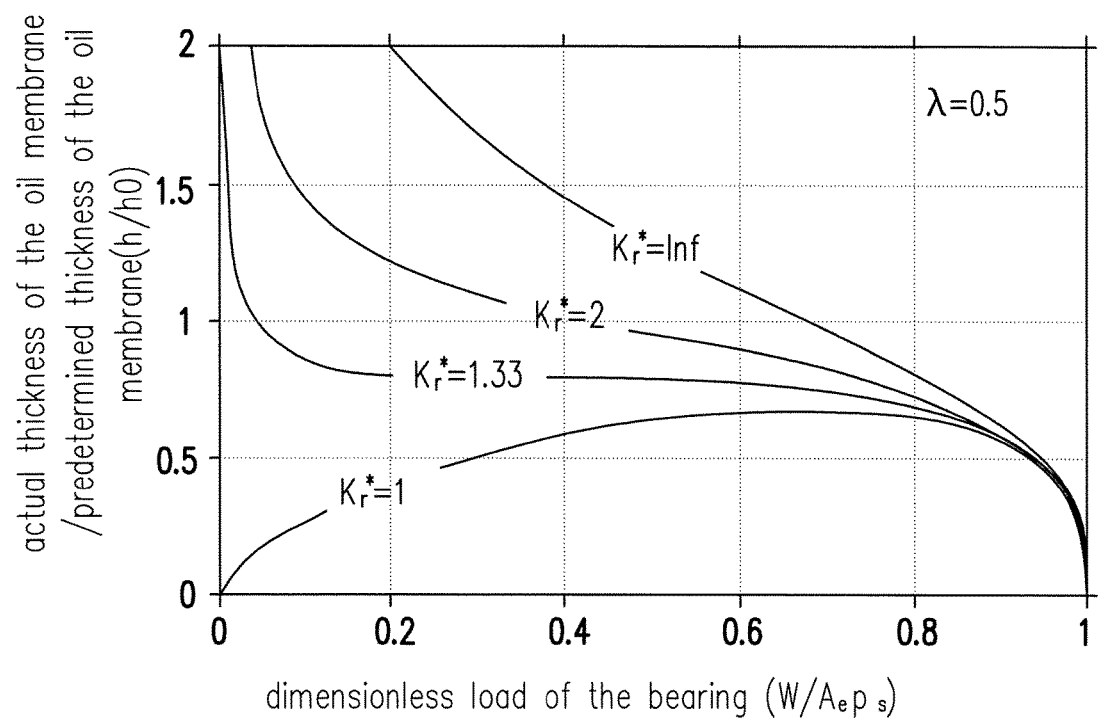

FIG. 2 to FIG. 4 respectively illustrate the relation of a dimensionless load of the bearing 50 and an actual thickness h/a predetermined thickness $h_0$ of the oil film 30 when a design restriction ratio $\lambda$ of the membrane restrictor 100 as depicted in FIG. 1 is 0.1, 0.25, and 0.5. It should be explained that the transverse axis in FIG. 2 to FIG. 4 shows the dimensionless load $W/A_e p_s$ of the bearing 50. The bearing 50 has a maximum load when the dimensionless load $W/A_e p_s$ of the bearing 50 is 1. The longitudinal axis shows a ratio of an actual thickness h/a predetermined thickness $h_0$ of the oil film 30. The actual thickness h of the oil film equals the predetermined thickness $h_0$ of the oil film when the ratio of the actual thickness h of the oil film 30 to the predetermined thickness $h_0$ of the oil film 30 is 1.

Referring to FIG. 2 to FIG. 4, the ratio of the actual thickness h of the oil film/the predetermined thickness $h_0$ of the oil film 30 (the longitudinal axis) approaches 0 when Kr* equals 1 and the dimensionless load $W/A_e p_s$ of the bearing 50 is relatively small. When the value of $K_r^*$ is infinite, it can only be applied to large load. Thereby, the dimensionless stiffness $K_r^*$ of the membrane restrictor 100 preferably falls in a range of $1.33 \leq K_r^* \leq 2$, most preferably equals 1.33. As shown in FIG. 2 to FIG. 4, when $K_r^*$ equals 1.33, and the dimensionless load $W/A_e p_s$ of the bearing 50 (the transverse axis) falls in a range of 0.1 to 0.8, the ratio of the actual thickness h of the oil film/a predetermined thickness $h_0$ of oil film 30 (the longitudinal axis) may be maintained within a fixed range.

Moreover, variations in the dimensionless stiffness $K_r^*$ of different membrane restrictors 100 generally tend to be similar when the design restriction ratio $\lambda$ is 0.1, 0.25, or 0.5. That is to say, good performance can be ensured when the design restriction ratio $\lambda$ falls in a range of $0.1 \leq \lambda \leq 0.5$. Additionally, as shown in FIG. 3, the ratio of the actual thickness h of the oil film 30/the predetermined thickness $h_0$ of the oil film 30 (the longitudinal axis) is close to 1 when the design restriction ratio $\lambda$ equals 0.25. That is to say, the actual thickness h of the oil film 30 is close to the predetermined thickness $h_0$ of the oil film 30. Hence, the design restriction ratio $\lambda$ most preferably equals 0.25.

In FIG. 3, marks standing for experimental values and represented by x exist within a range from approximately 0.1 to 0.5 of the dimensionless load $W/A_e p_s$ of the bearing 50 (the transverse axis). As shown in FIG. 3, the experimental values are considerably close to the simulation curve. In other words, in this embodiment, the membrane restrictor 100 is designed to have a design restriction ratio $\lambda$ equal to 0.25 and a dimensionless stiffness $K_r^*$ of the membrane 120 equal to 1.33, such that the thickness of an oil film 30 between the bearing 50 and the rail 20 can remain at a certain level, and that good stiffness of the bearing 50 may be ensured.

Undoubtedly, the types of the membrane restrictor 100 designed according to the aforementioned design parameters are not limited to the type shown in FIG. 1. In FIG. 1, the membrane restrictor 100 and the bearing 50 are two separated objects. In following embodiments, an exemplary form of a membrane restrictor 100a integrated on a bearing 50a is provided. It should be explained that known membrane restrictors can, due to the large volume, merely be disposed outside of the bearing, and it is difficult to integrate the known membrane restrictors on the bearing. Moreover, in terms of the known membrane restrictors, even considering the reduction of the volume of the known membrane restrictors, good performance of the membrane restrictors cannot be guaranteed merely by scaling down the design parameters of the membrane restrictors in proportion. In the following embodiments, the membrane restrictor 100a may be microminiaturized to be integrated on the bearing 50a and have good performance because the design parameters of the membrane restrictor 100a satisfy $1.33 \leq K_r^* \leq 2$ and $0.1 \leq \lambda \leq 0.5$.

Figure 5:
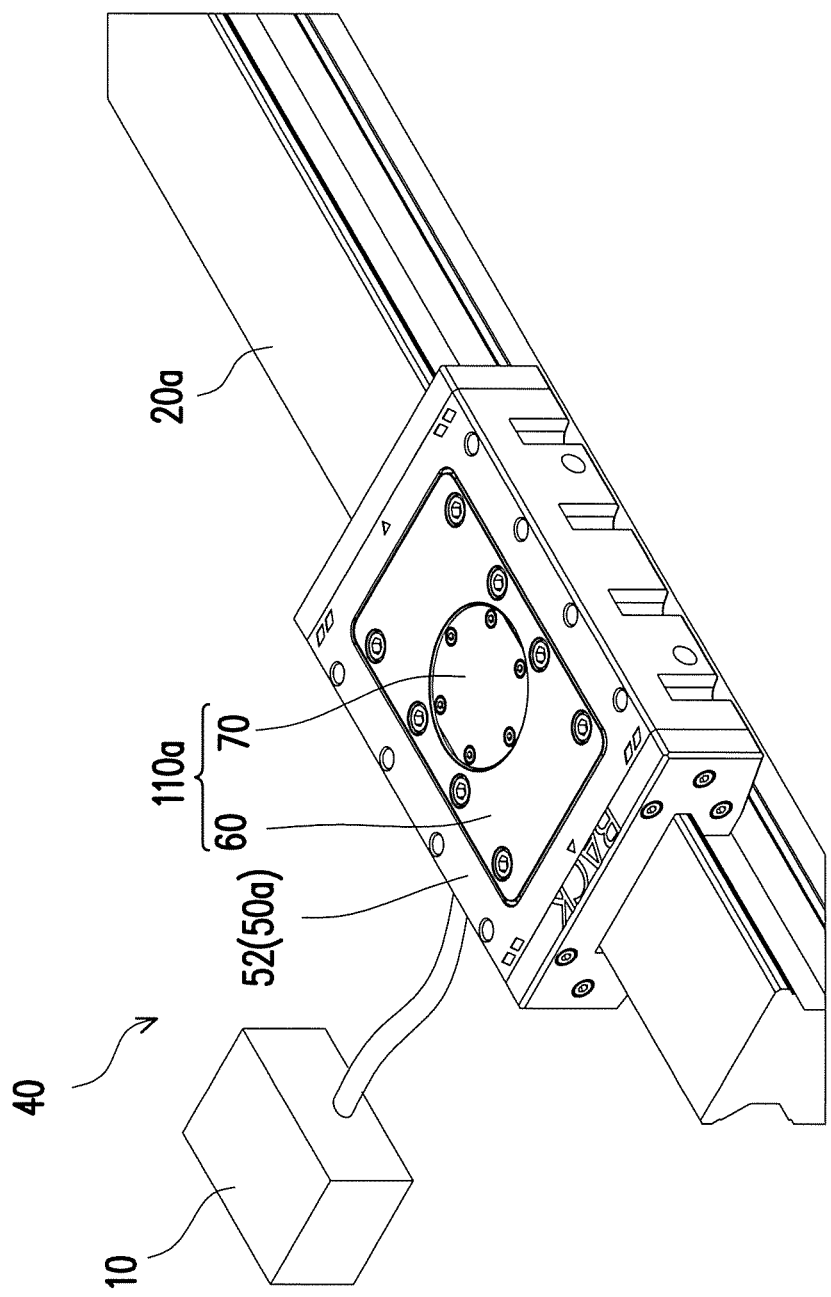
FIG. 5 is a schematic diagram illustrating a hydrostatic bearing module in an embodiment of the invention.
Figure 6:
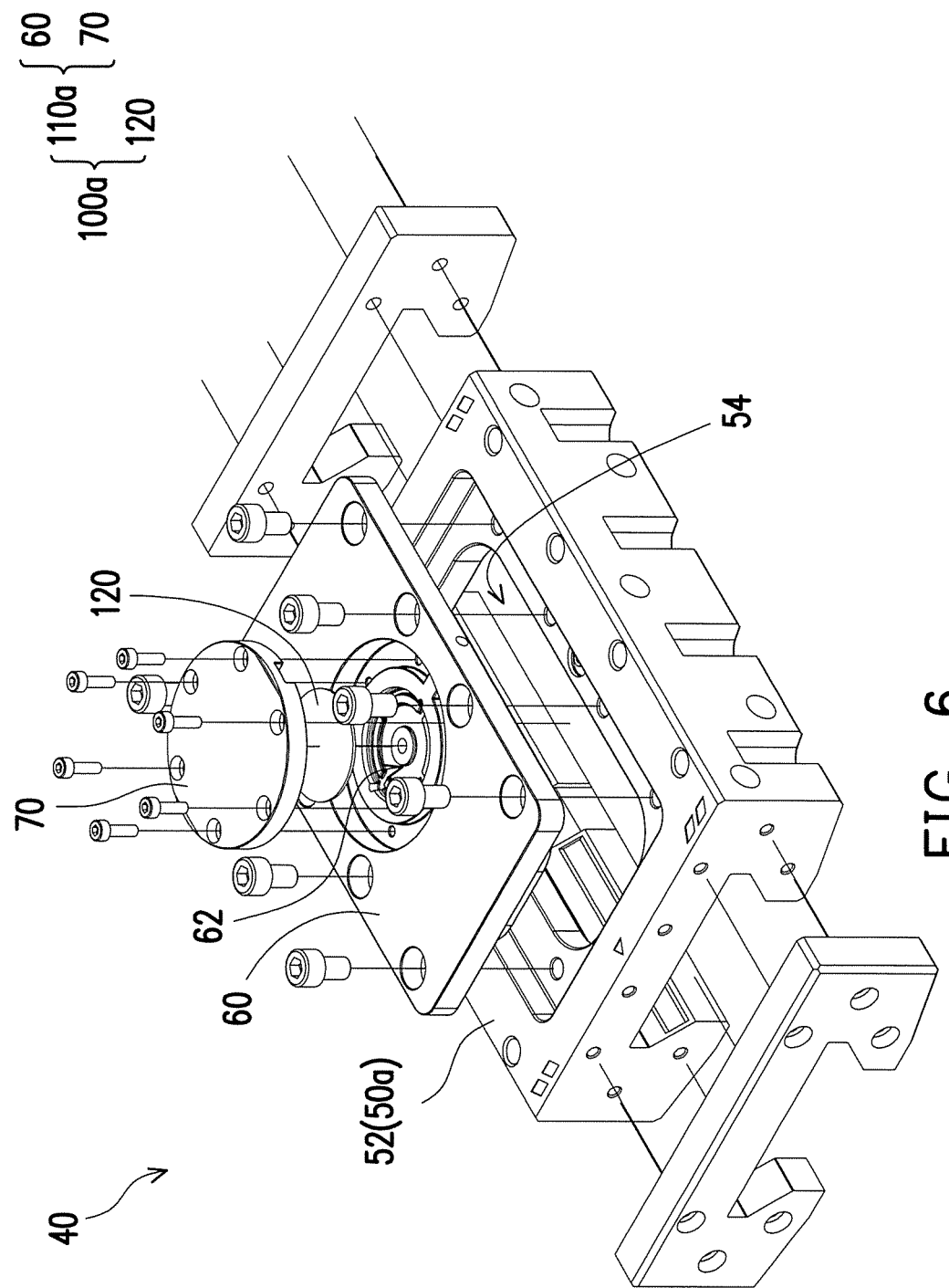
FIG. 6 is a schematic explosion diagram illustrating the hydrostatic bearing module in FIG. 5.
Figure 7:
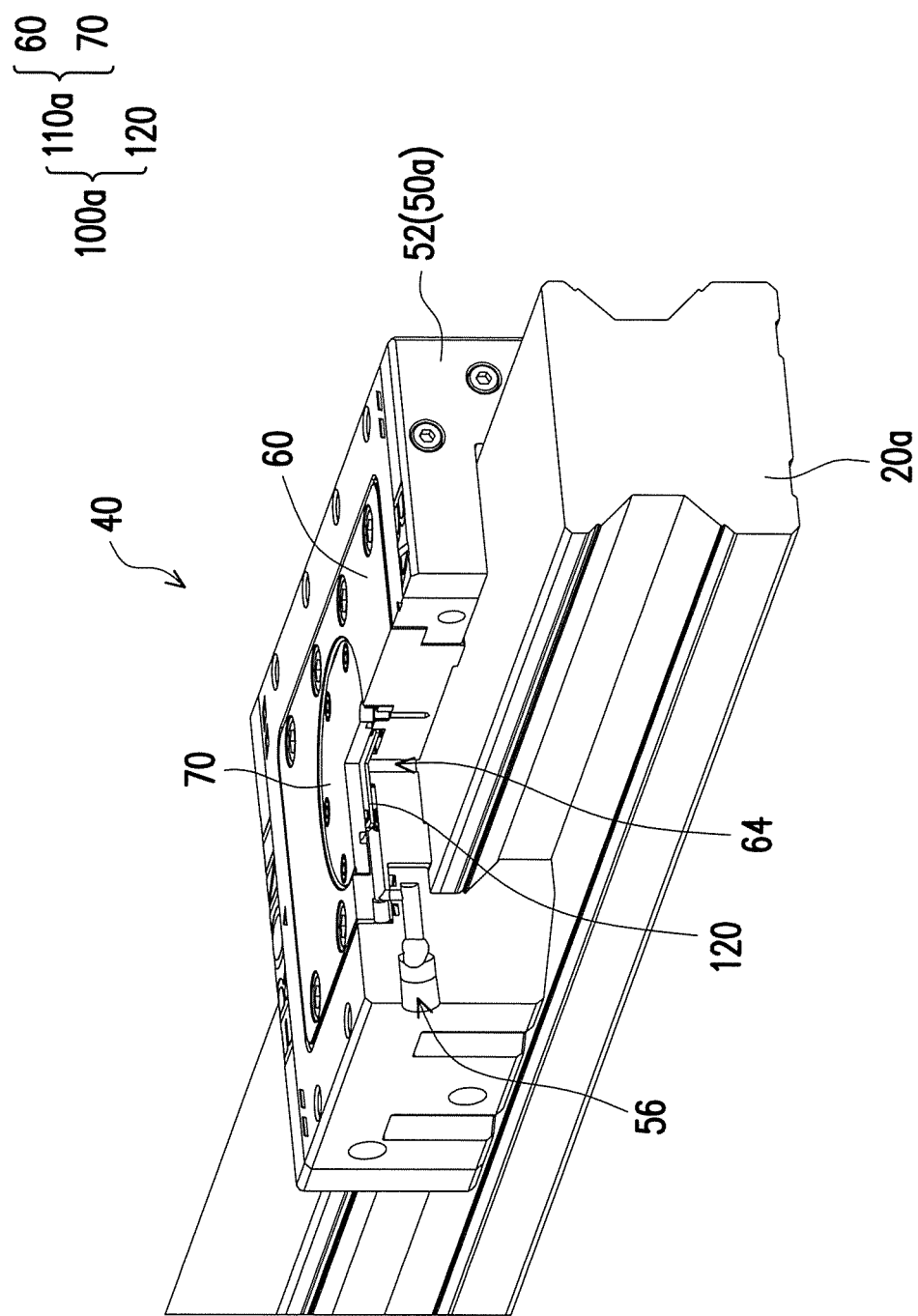
FIG. 7 is a schematic three-dimensional cross-sectional view illustrating the bearing module in FIG. 5.
Figure 8:
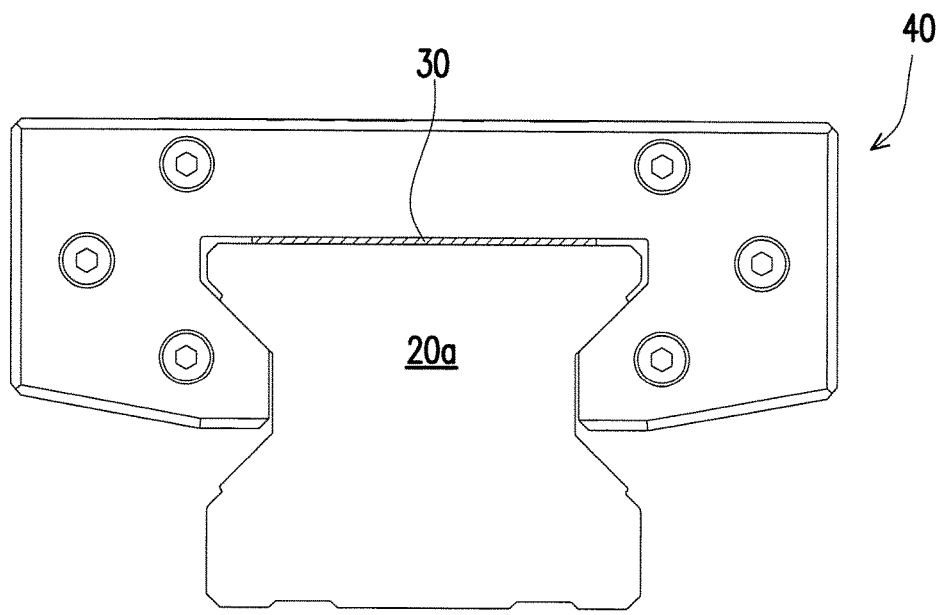
FIG. 8 is a schematic cross-sectional view illustrating the hydrostatic bearing module in FIG. 5.

FIG. 5 is a schematic diagram illustrating a hydrostatic bearing module in an embodiment of the invention. FIG. 6 is a schematic explosion diagram illustrating the hydrostatic bearing module in FIG. 5. FIG. 7 is a schematic three-dimensional cross-sectional view illustrating the bearing module in FIG. 5. FIG. 8 is a schematic cross-sectional view illustrating the hydrostatic bearing module in FIG. 5.

Referring to FIG. 5 to FIG. 8, a hydrostatic bearing module 40 provided in this embodiment is adapted to be movably disposed on a rail 20a and connected to a pump 10. In this embodiment, the rail 20a is presented in a shape close to a letter I, but the type of the rail 20a is not limited thereto. As shown in FIG. 6, the hydrostatic bearing module 40 includes a bearing 50a and a membrane restrictor 100a integrated on the bearing 50a. The pump 10 is adapted to supply fluid to a location between the hydrostatic bearing module 40 and the rail 20a through the membrane restrictor 100a, so as to form a lubricating oil film 30 (shown in FIG. 8) between the hydrostatic bearing module 40 and the rail 20a.

More specifically, in this embodiment, the bearing 50a includes a sliding block 52 slidably fitting the rail 20a. The sliding block 52 has a through groove 54. The membrane restrictor 100a is detachably disposed on the sliding block 52. The membrane restrictor 100a includes a casing 110a and a membrane 120. In this embodiment, the casing 110a of the membrane restrictor 100a is a plate 60 detachably disposed in the through groove 54 of the sliding block 52 and a cover 70 detachably disposed on the plate 60.

The plate 60 includes a recess 62 and a through hole 64 (shown in FIG. 7) communicating with the recess 62. The membrane 120 is disposed in the recess 62. The recess 62 may further communication with an inlet 56 of the sliding block 52. Fluid supplied by the pump 10 (shown in FIG. 5) is adapted to enter the recess 62 from the inlet 56 (shown in FIG. 7) on the sliding block 52, flow into the upper half and the lower half of the membrane 120, and flow to a location between the plate 60 and the rail 20a through the through hole 64 to form the oil film 30, as shown in FIG. 8. In this embodiment, the dimensionless stiffness $K_r^*$ of the membrane 120 of the membrane restrictor 100a and the design restriction ratio λ are respectively within the range of $1.33 \leq K_r^* \leq 2$ and within the range of $0.1 \leq \lambda \leq 0.5$, such that good stiffness of the hydrostatic bearing module 40 may be ensured. More preferably, the design restriction ratio λ of the membrane restrictor 100a equals 0.25, and the dimensionless stiffness $K_r^*$ of the membrane 120 of the membrane restrictor 100a equals 1.33, such that the oil film 30 located between the hydrostatic bearing module 40 and the rail 20a is maintained to be of a certain thickness, and that the hydrostatic bearing module 40 may have the optimal stiffness.

In this embodiment, it should be explained that the membrane restrictor 100a is detachably disposed on the bearing 50a through locking, which is conducive to easy manufacture and repair. Nevertheless, the membrane restrictor 100a may also be detachably disposed on the bearing 50a through clamping or engagement, which should not be construed as a limitation to the invention. Moreover, in other embodiments, the membrane restrictor 100a may also be undetachably disposed on the bearing 50a. For example, the casing 110a of the membrane restrictor 100a is integrally formed or is welded to the bearing 50a. As long as the membrane restrictor 100a is integrated on the bearing 50a, the manner in which the membrane restrictor 100a and the bearing 50a are secured to each other is not limited to that provided above.

Figure 9:
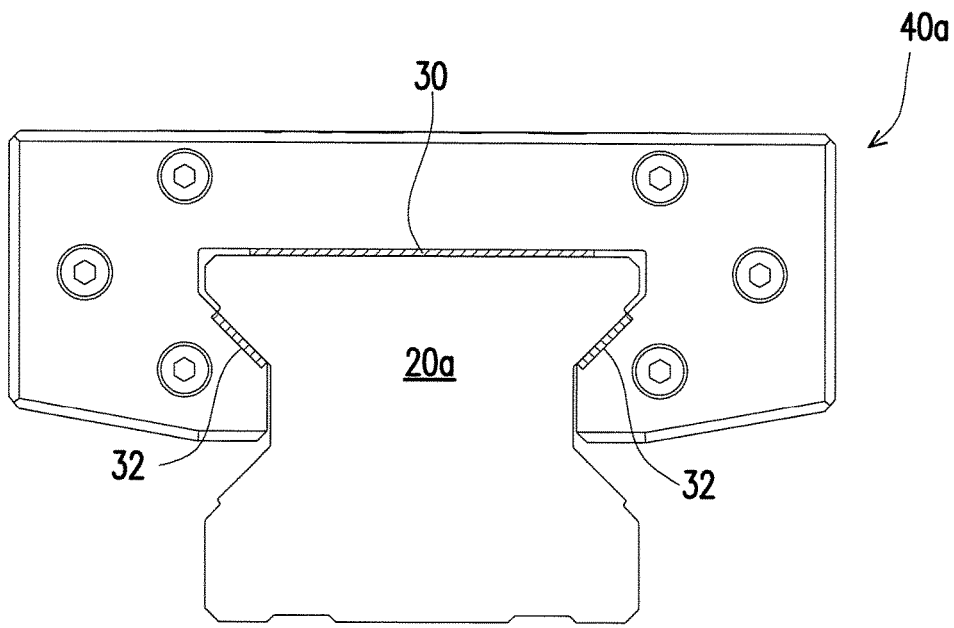
FIG. 9 is a schematic cross-sectional view illustrating a hydrostatic bearing module in another embodiment of the invention.

FIG. 9 is a schematic cross-sectional view illustrating a hydrostatic bearing module in another embodiment of the invention. Referring to FIG. 9, a major difference between this embodiment and the embodiment illustrated in FIG. 8 lies in that in addition to the oil film 30 existing between the hydrostatic bearing module 40a and a location right above the rail 20a in the present embodiment, another oil film 32 exists between the hydrostatic bearing module 40a and two sides of the rail 20a, such that the hydrostatic bearing module 40a may slide on the rail 20a in a closed-form framework. The oil film 32 may be controlled by the membrane restrictor 100a, a capillary restrictor (not depicted), a orifice restrictor (not depicted), or a constant-flow restrictor (not depicted). In other words, the oil films 30 and 32 at different locations may be controlled by restrictors of single type or by restrictors of multiple types, and oil paths between the oil films 30 and 32 may not communicate with each other.

To sum up, the membrane restrictor of the hydrostatic bearing module provided in the invention is able to maintain the oil film between the bearing and the rail to be of a certain thickness by limiting the dimensionless stiffness $K_r^*$ of the membrane in the range of $1.33 \leq Kr^* \leq 2$, so as to ensure good stiffness of the bearing. Moreover, the bearing may have the improved stiffness when the design restriction ratio λ falls in the range of $0.1 \leq \lambda \leq 0.5$ and when the dimensionless stiffness $K_r^*$ of the membrane falls in the range of $1.33 \leq K_r^* \leq 2$ e.g., λ=0.25 and $K_r^*$=1.33. Additionally, the membrane restrictor may be integrated on the bearing. Thereby, the membrane restrictor occupies a small volume, and the membrane restrictor is still capable of achieving good effects.

It will be apparent to those skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. A membrane restrictor adapted to be connected to a pump and a bearing, the bearing being adapted to be disposed on a rail, the pump being adapted to supply fluid to a location between the bearing and the rail through the membrane restrictor, the membrane restrictor comprising:
   a casing comprising a chamber, an inlet and an outlet communicating with
   the chamber, and a restricting plane, wherein the pump is adapted to be connected to the inlet, and the bearing is adapted to be connected to the outlet; and
   a membrane located in the chamber, the restricting plane being an inner surface of the casing located adjacent to the outlet and facing toward the membrane,
   wherein dimensionless stiffness of the membrane is $K_r^*$, and $1.33 \leq K_r^* \leq 2$,
   wherein $K_r^* = K_r L_0/(p_s A_r)$, Kr is stiffness of the membrane, $L_0$ is a distance, also known as assembling clearance of the membrane, from the membrane to the restricting plane when no fluid is supplied by the pump, $p_s$ is a hydraulic pressure supplied by the pump, and $A_r$ is an effective area of the restricting plane.

2. The membrane restrictor of claim 1, wherein the dimensionless stiffness $K_r^*$ of the membrane restrictor equals 1.33.

3. The membrane restrictor of claim 1, wherein a design restriction ratio of the membrane restrictor is λ, and $0.1 \leq \lambda \leq 0.5$, wherein $\lambda = R_{ri}/R_0$; $R_{ri}$ is a hydraulic resistance of the fluid flowing through the restricting plane when the distance from the membrane to the restricting plane is $L_0$, and $R_0$ is a predetermined hydraulic resistance of the fluid flowing through the bearing.

4. The membrane restrictor of claim 3, wherein the design restriction ratio λ of the membrane restrictor equals 0.25.

5. A hydrostatic bearing module adapted to be movably disposed on a rail and connected to a pump, the hydrostatic bearing module comprising:
- a bearing adapted to be movably disposed on the rail;
- a membrane restrictor integrated on the bearing, the pump being adapted to supply fluid to a location between the bearing and the rail through the membrane restrictor, the membrane restrictor comprising:
  - a casing comprising a chamber, an inlet and an outlet communicating with the chamber, and a restricting plane, wherein the pump is adapted to be connected to the inlet, and the bearing is adapted to be connected to the outlet; and
  - a membrane located in the chamber, the restricting plane being an inner surface of the casing located adjacent to the outlet and facing toward the membrane, wherein dimensionless stiffness of the restricting plane is $K_r^*$, $K_r^* = K_r L_0/(p_s A_r)$, and $1.33 \leq K_r^* \leq 2$, wherein $K_r$ is stiffness of the membrane, $L_0$ is a distance, also known as assembling clearance of the membrane, from the membrane to the restricting plane when no fluid is supplied by the pump, $p_s$ is a hydraulic pressure supplied by the pump, and $A_r$ is an effective area of the restricting plane.

6. The hydrostatic bearing module of claim 5, wherein the dimensionless stiffness $K_r^*$ of the membrane equals 1.33.

7. The hydrostatic bearing module of claim 5, wherein a design restriction ratio of the membrane restrictor is λ, $\lambda = R_{r1}/R_0$, and $0.1 \leq \lambda \leq 0.5$, wherein $R_{r1}$ is a hydraulic resistance of the fluid flowing through the restricting plane when the distance from the membrane to the restricting plane is $L_0$, and $R_0$ is a predetermined hydraulic resistance of the fluid flowing through the bearing.

8. The hydrostatic bearing module of claim 5, wherein the design restriction ratio λ of the membrane restrictor equals 0.25.

9. The hydrostatic bearing module of claim 5, wherein the bearing comprises a sliding block slidably fitting the rail, and the membrane restrictor is detachably disposed on the sliding block.

10. The hydrostatic bearing module of claim 9, wherein the casing of the membrane restrictor comprises a plate detachably disposed on the sliding block and a cover detachably disposed on the plate, the plate comprises a recess and a through hole communicating with the recess, the membrane is disposed in the recess, and the fluid is adapted to flow to a location between the plate and the rail through the through hole.

* * * * *